US008473009B2

(12) United States Patent
Onda et al.

(10) Patent No.: US 8,473,009 B2
(45) Date of Patent: Jun. 25, 2013

(54) COMMUNICATION TERMINAL AND COMPUTER READABLE MEDIUM

(75) Inventors: Yasushi Onda, Tokyo (JP); Izua Kano, Yokohama (JP); Dai Kamiya, Tokyo (JP); Keiichi Murakami, Ichikawa (JP); Eiju Yamada, Yokohama (JP); Kazuhiro Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1057 days.

(21) Appl. No.: 12/055,460

(22) Filed: Mar. 26, 2008

(65) Prior Publication Data

US 2008/0242361 A1 Oct. 2, 2008

(30) Foreign Application Priority Data

Mar. 29, 2007 (JP) .................. 2007-087062

(51) Int. Cl.
*H04W 4/00* (2009.01)
*H04M 1/00* (2006.01)

(52) U.S. Cl.
USPC .......... 455/566; 455/550.1; 455/466

(58) Field of Classification Search
USPC ............. 455/414.1, 415, 418, 550.1, 466, 455/566
See application file for complete search history.

(56) References Cited

U.S. PATENT DOCUMENTS

| 5,946,647 | A * | 8/1999 | Miller et al. ............ 704/9 |
| 6,823,183 | B2 * | 11/2004 | Narusawa ............. 455/412.1 |
| 7,289,796 | B2 * | 10/2007 | Kudoh ............. 455/415 |
| 7,606,599 | B2 * | 10/2009 | Wakasa et al. ............. 455/566 |
| 8,374,651 | B2 * | 2/2013 | Onda et al. ............. 455/566 |
| 2004/0027364 | A1 | 2/2004 | Ohtani et al. |
| 2011/0004555 | A1 * | 1/2011 | Onda et al. ............. 705/59 |

FOREIGN PATENT DOCUMENTS

| GB | 2379830 A | 3/2003 |
| JP | 04-172835 | 6/1992 |
| JP | 09-146892 | 6/1997 |
| JP | 10-222573 | 8/1998 |
| JP | 11-041369 | 2/1999 |
| JP | 2001-268206 | 9/2001 |
| JP | 2002-252705 | 6/2002 |
| JP | 2005-027063 | 1/2005 |
| WO | WO 01/54380 * | 7/2001 |
| WO | 2006082506 A1 | 10/2006 |

OTHER PUBLICATIONS

Japanese Office Action for JP2007-087062, dated Oct. 26, 2010.
Extended Search Report for European Patent Application No. 08005582.5-2414/1976243 dated Apr. 5, 2012.

* cited by examiner

*Primary Examiner* — Andrew Wendell
(74) *Attorney, Agent, or Firm* — Michaud-Kinney Group LLP (57) ABSTRACT

A CPU of mobile a terminal causes, if to-do data is selected on a to-do review screen, a liquid crystal display to display a to-do data confirmation screen of the to-do data. In the to-do data confirmation screen, if the to-do data contains a character string that is an index of a telephone number or an email address in a phonebook data storage area, the character string is linked to the telephone number or the email address.

13 Claims, 9 Drawing Sheets

| INDEX | TELEPHONE NUMBER | EMAIL ADDRESS | ADDRESS | BIRTHDAY | GROUP | STILL IMAGE |
|---|---|---|---|---|---|---|
| TARO YOSHIDA | 090\*\*\*\*\*\*\*\*\* | ---@abc.ne.jp | MINATO-KU TOKYO·· | 1970/1/1 | FRIEND | JIF001 |
| A CORPORATION | 03\*\*\*\*\*\*\*\* | ---@abc.ne.jp | SHIBUYA-KU TOKYO· | — | BUSINESS PARTNER | — |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |

FIG. 4

| TASK | DATE | PRIORITY LEVEL | CATEGORY | ALARM NOTIFICATION | LATEST REVIEWED DATE |
|---|---|---|---|---|---|
| CONTACT A CORPORATION REGARDING SO-AND-SO. SEND AN EMAIL TO SO-AND-SO DIVISION. | 2006/9/1 | HIGH | WORK | NOT NECESSARY | 2006/8/1 /18:32 |
| TRAVEL TO SO-AND-SO WITH TARO YOSHIDA. MAKE A PHONE CALL TO HIM BY THE PREVIOUS DAY TO CONFIRM A MEETING PLACE. | 2006/9/11 /10:00 | LOW | PRIVATE | NECESSARY | 2006/8/1 /18:34 |
| ... | ... | ... | ... | ... | ... |
| ... | ... | ... | ... | ... | ... |
| ... | ... | ... | ... | ... | ... |

FIG. 5

| DESTINATION | COMMUNICATION DATE |
|---|---|
| 090******** | 2006/8/30 /9:32 |
| --@abc.ne.jp | 2006/8/29 /18:10 |
| 03******** | 2006/8/27 /19:02 |
| ... | ... |
| ... | ... |

FIG. 12

COMMUNICATION TERMINAL AND COMPUTER READABLE MEDIUM

CROSS-REFERENCE TO RELATED APPLICATIONS

This application is based on and claims priority under 35 USC 119 from Japanese Patent Application No. 2007-087062 filed on Mar. 29, 2007.

BACKGROUND

1. Technical Field

The present invention relates to a communication terminal.

2. Related Art

Most recent cell-phones are provided with, in addition to an application program for managing voice communication, an application program for managing exchange of emails and an application program for managing site browsing, as is commonly known. There have been attempts to link the application programs to provide a user with convenient services, and a variety of techniques supporting such attempts have been proposed. For example, JP-A-2001-268203 proposes a cell-phone that is configured to, if a character string described in a received email is selected by a user, display a message asking the user whether the character string should be registered in a phonebook with a telephone number or a message asking the user whether a call to a telephone number registered with the character string in a phonebook should be originated.

Most recent cell-phones are also provided with application programs for services that are not directly related to a communication service. Among such application programs, one of the most frequently used is a to-do application program. A to-do application program is a program for registering a task to be completed together with a time and date, and when the registered time and date come, activating an alarm or showing an alert screen.

A user of a to-do application program can register as a task an intention to contact someone by sending an email or making a phone call. Such a task can be registered as text such as "contact so-and-so via email by so-and-so a date" or "make a phone call to Mr. so-and-so by so-and-so a time on so-and-so a date of so-and-so a month". However, a user has had to, when alerted to such a task, manually input a telephone number or an email address of a destination or search a phonebook for a telephone number or an email address of a destination.

The present invention has been made in view of the problem, and provides a technique for linking a character string generated using a program such as a to-do application program and a communication function of a communication terminal to improve usability of the communication terminal.

SUMMARY

A first aspect of the present invention provides a communication terminal comprising: a display; a communication interface; a first memory having: a first storage area in which data including a character string can be stored; a second storage area in which a communication address assigned to another communication terminal can be stored in association with a reference name; and a third storage area in which a communication address to which communication has been made using the communication interface can be stored; and a processor configured to: identify a character string that is contained in data stored in the first storage area and is identical to a reference name stored in the second storage area, the reference name being not a reference name stored in association with a communication address stored in the third storage area; and display the identified character string with a link to a communication address stored in the second storage area in association with the reference name identical to the identified character string, on the display.

A second aspect of the present invention provides a communication terminal comprising: a display; a communication interface; a first memory having: a first storage area in which data including a character string can be stored; a second storage area in which a communication address assigned to another communication terminal can be stored in association with a reference name; and a third storage area in which a communication address to which communication has been made using the communication interface can be stored; and a processor configured to: identify a character string that is contained in data stored in the first storage area and is identical to a reference name stored in the second storage area; display the identified character string in a first display style, if the reference name identical to the identified character string is a reference name stored in association with a communication address stored in the third storage area; and display the identified character string in a second display style, if the reference name identical to the identified character string is not a reference name stored in association with a communication address stored in the third storage area.

The communication terminal according to the first or second aspect of the present invention may further comprise: a second memory that stores a communication program; and an instruction input unit, and the processor may be further configured to execute the communication program, if the identified character string is selected using the instruction input unit.

The communication terminal according to the first or second aspect of the present invention may further comprise a third memory in which voice data can be stored in association with a communication address, and the processor may be further configured to: match voice data received from another communication terminal using the communication interface to voice data stored in the third memory to determine a similarity level between the two pieces of voice data; and if the determined similarity level is above a predetermined threshold, store a communication address stored in the third memory in association with the voice data stored in the third memory.

In the communication terminal according to the first or second aspect of the present invention, the communication address may include a telephone number and an email address.

In the communication terminal according to the first aspect of the present invention, in the third storage area, a communication address to which communication has been made using the communication interface may be stored in association with a communication time and date when the communication has been made, and the processor may be configured to identify a character string that is contained in data stored in the first storage area and is identical to a reference name stored in the second storage area, the reference name being not a reference name stored in association with a communication address stored in the third storage area, the communication address being stored in association with a communication time and date belonging to a predetermined time period.

A third aspect of the present invention provides a computer readable medium storing a program for causing a processor of a computer having: a display; a communication interface; a first memory having: a first storage area in which data including a character string can be stored; and a second storage area in which a communication address assigned to another communication terminal can be stored in association with a reference name; and a third storage area in which a communication address to which communication has been made using the communication interface can be stored, to: identify a character string that is contained in data stored in the first storage area and is identical to a reference name stored in the second storage area, the reference name being not a reference name stored in association with a communication address stored in the third storage area; and display the identified character string with a link to a communication address stored in the second storage area in association with the reference name identical to the identified character string, on the display.

A fourth aspect of the present invention provides a computer readable medium storing a program for causing a processor of a computer having: a display; a communication interface; a first memory having: a first storage area in which data including a character string can be stored; a second storage area in which a communication address assigned to another communication terminal can be stored in association with a reference name; and a third storage area in which a communication address to which communication has been made using the communication interface can be stored, to: identify a character string that is contained in data stored in the first storage area and is identical to a reference name stored in the second storage area; display the identified character string in a first display style, if the reference name identical to the identified character string is a reference name stored in association with a communication address stored in the third storage area; and display the identified character string in a second display style, if the reference name identical to the identified character string is not a reference name stored in association with a communication address stored in the third storage area.

BRIEF DESCRIPTION OF THE DRAWINGS

Embodiments of the present invention will now be described in detail with reference to the following figures, wherein.

DETAILED DESCRIPTION

An embodiment of the present invention will be described.

Figure 1:
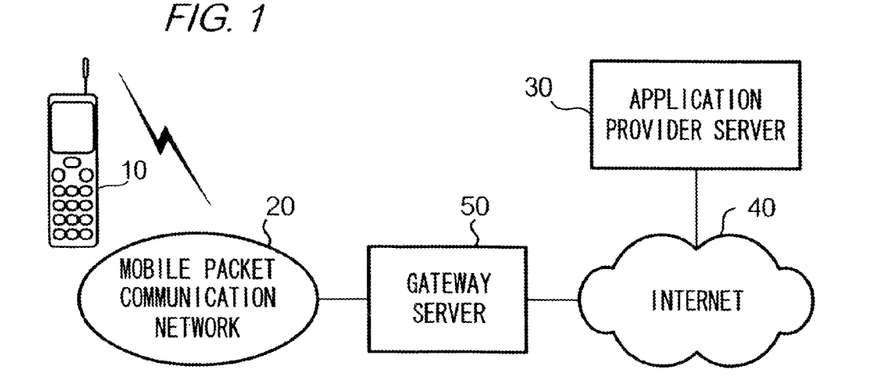
FIG. 1 is a diagram illustrating a configuration of an embodiment.

FIG. 1 is a diagram illustrating a configuration of a communication system according to the present embodiment. As shown in the drawing, the communication system includes mobile packet communication network 20 to which mobile terminal 10 can be connected, Internet 40 to which application provider server 30 can be connected, and gateway server 50 lying between the two communication networks.

Mobile packet communication network 20 consists of a collection of nodes that transfer data in accordance with a simplified TCP (Transmission Control Protocol)/IP (Internet Protocol) and a protocol equivalent to HTTP (HyperText Transfer Protocol), which is used together with the TCP/IP. Mobile packet communication network 20 includes base stations and a packet subscriber processing device. Internet 40 consists of a collection of nodes that transfer data in accordance with TCP/IP, and HTTP and SMTP (Simple Mail Transfer Protocol) which is used together with the TCP/IP. Internet 40 includes servers and routers.

Gateway server 50 is a computer working in a mobile packet gateway switch center that interconnects mobile packet communication network 20 and Internet 40. On receipt of data that is sent from a node of a network to a node of another network, gateway server 50 converts the data to data formatted for a protocol of the other network, and transfers the converted data to the node of the other network.

Figure 2:
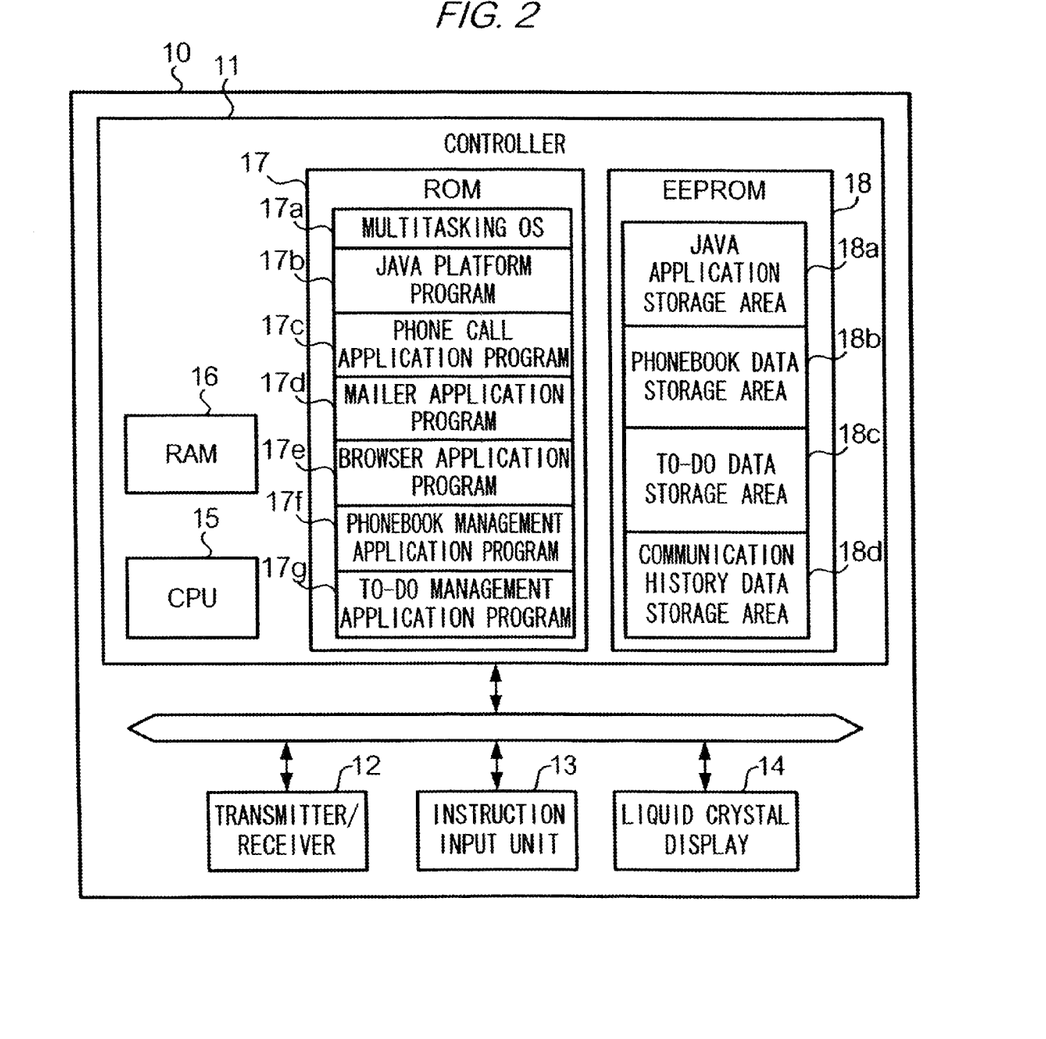
FIG. 2 is a diagram illustrating a configuration of a mobile terminal.

FIG. 2 is a diagram illustrating a hardware configuration of mobile terminal 10. Mobile terminal 10 includes controller 11, transmitter/receiver 12, instruction input unit 13, and liquid crystal display 14.

Transmitter/receiver 12 carries out wireless communication with a base station of mobile packet communication network 20 under control of controller 11.

Instruction input unit 13 has push buttons and cursor-control keys, and in response to an input operation by a user, sends an operation signal corresponding to the input operation to controller 11. Liquid crystal display 14 has a liquid crystal panel, and displays information under the control of controller 11.

Controller 11 has CPU 15, RAM 16, ROM 17, and EEPROM 18.

CPU 15 runs a program stored in ROM 17 or EEPROM 18 while using RAM 16 as a working area.

ROM 17 stores preinstalled programs. The preinstalled programs are stored in ROM 17 in a manufacturing process of mobile terminal 10, and specifically are multitasking operating system (hereinafter referred to as "multitasking OS") 17a, Java (Registered Trademark) platform program 17b, phone call application program 17c, mailer application program 17d, browser application program 17e, phonebook management application program 17f, and to-do management application program 17g.

Among the programs, multitasking OS 17a is an operating system supporting functions such as allocation of virtual memory spaces, which are necessary to realize a pseudo-parallel execution of plural tasks using a TSS (Time-Sharing System). Java platform program 17b is a collection of programs that are described in accordance with a CDC (Connected Device Configuration). When Java platform program 17b is executed, a Java execution environment including a class library, a JVM (Java Virtual Machine), and a JAM (Java Application Manager) is provided.

Phone call application program 17c is a program for managing receipt and initiation of a call and transfer of voice signals.

Mailer application program 17d is a program for managing editing and exchange of an email.

Browser application program 17e is a program for managing receipt and interpretation of HTML (HyperText Markup Language) data.

Phonebook management application program 17f is a program for managing personal information of destinations of a call or an email. Personal information managed by use of the program includes a telephone number, an email address, an address, a birthday, a group, and a still image that is displayed on liquid crystal display 14 when a call is received. When new personal information is registered, a user operates instruction input unit 13 to cause liquid crystal display 14 to display a phonebook registration screen, and inputs on the screen personal information and a reference name such as "Taro Yoshida" or "A corporation" that serves as an index. On a phonebook registration screen, registration of a telephone number, an email address, and an index is necessary; however, registration of other personal information is optional. When registered personal information is reviewed, a user operates instruction input unit 13 to cause liquid crystal display 14 to display a phonebook review screen, and selects from the screen a person whose personal information is to be reviewed. If a displayed telephone number is highlighted and selected, a call to the telephone number is originated, and if a displayed email address is highlighted and selected, an email is sent to the email address.

To-do management application program 17g is a program for managing information relevant to tasks to be completed by a user (hereinafter referred to as "to-do data"). To-do data managed using the program includes a content of a task to be completed by a user, date on which a task is completed, a priority level such as "high", "medium", or "low", a category of a task such as "private", "holiday", "travel", "work", or "meeting", and necessity of an alarm notification that is activated when a date comes. When new to-do data is registered, a user operates instruction input unit 13 to cause liquid crystal display 14 to display a to-do registration screen, and inputs on the screen to-do data. When registered to-do information is reviewed, a user operates instruction input unit 13 to cause liquid crystal display 14 to display a to-do review screen, and selects from the screen to-do data to cause liquid crystal display 14 to display a to-do data confirmation screen of the to-do data.

EEPROM 18 has Java application storage area 18a, phonebook data storage area 18b, to-do data storage area 18c, and communication history data storage area 18d.

Java application storage area 18a stores Java applications. A Java application consists of: a JAR (Java ARchive) file including a main program that are instructions executed under a Java execution environment, and image files and audio files used when the main program is running; and an ADF (Application Descriptor File) in which information on installation and execution of the main program and attribute information of the main program are described. A Java application is stored in a server on Internet 40, and in response to a request from mobile terminal 10, sent to mobile terminal 10 from the server.

Figure 3:
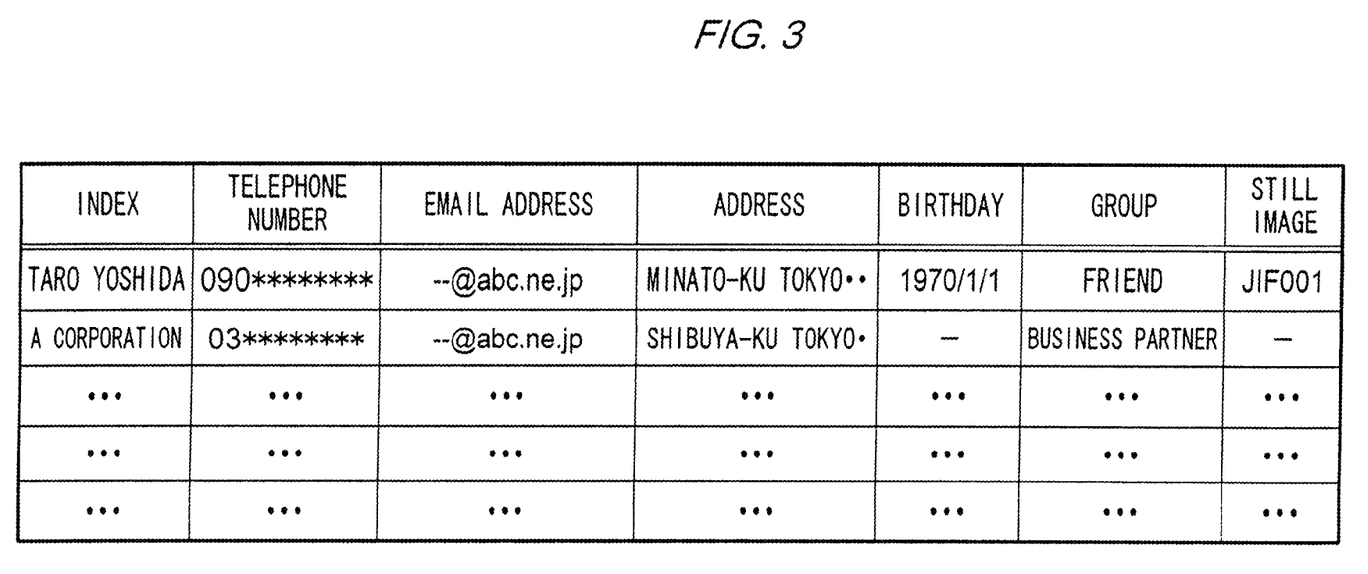
FIG. 3 is a data structure diagram of a table stored in a phonebook data storage area.
Figure 4:
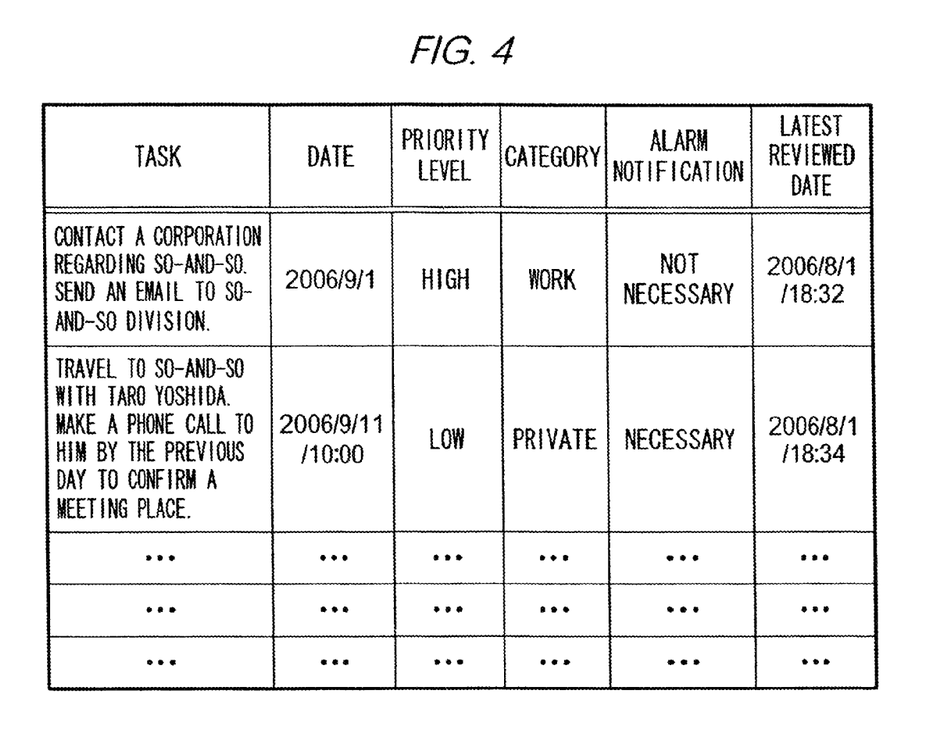
FIG. 4 is a data structure diagram of a table stored in a to-do data storage area.

Phonebook data storage area 18b stores phonebook data generated using phonebook management application program 17f, in a table form. FIG. 3 is a data structure diagram of a generated table.

As shown in the drawing, each record of a table stored in phonebook data storage area 18b has six fields: "task"; "date"; "priority level"; "category"; "alarm notification"; and "latest reviewed date". In the five fields other than "latest reviewed date", data input on a to-do registration screen is entered, and in the field of "latest reviewed date", a latest time and data on which registered to-do date was reviewed is entered.

Figure 5:
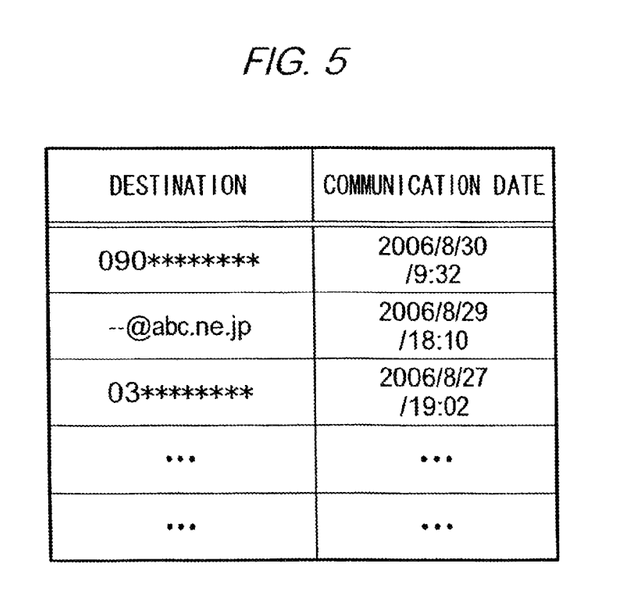
FIG. 5 is a data structure diagram of a table stored in a communication history data storage area.

Communication history data storage area 18d stores communication history data in a table form. FIG. 5 is a data structure diagram of a table stored in communication history data storage area 18d.

As shown in the drawing, each record of a table stored in communication history data storage area 18d has two fields, "destination" and "communication date". A record is added each time a call is originated using phone call application program 17c or an email is sent using mailer application program 17d. In the "destination" field, a telephone number to which a call is originated or an email address to which an email is sent is entered, and in the "communication date" field, a time and date on which a call is originated or an email is sent is entered.

Figure 6:
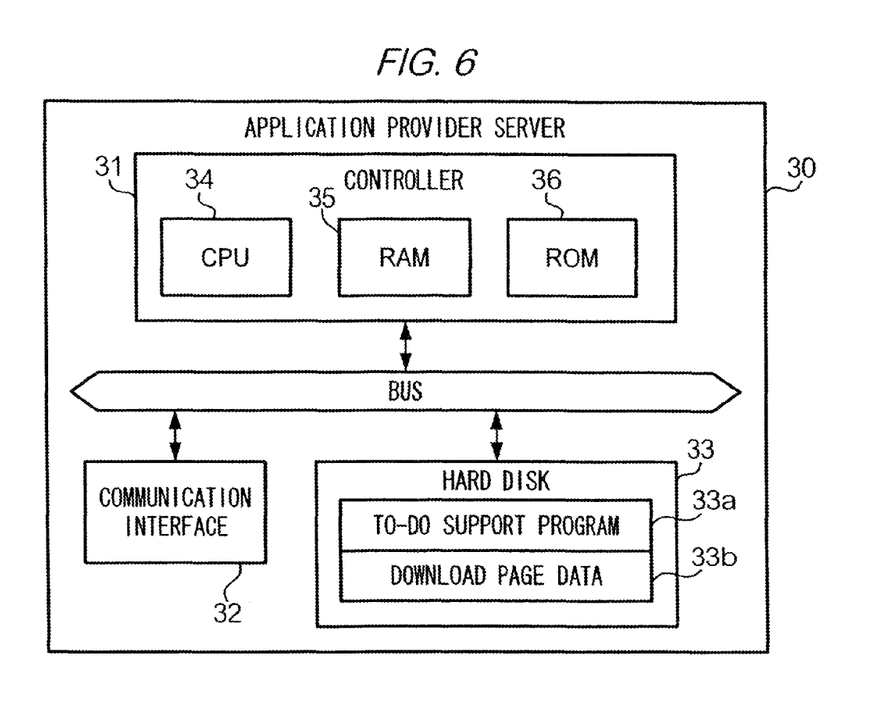
FIG. 6 is a schematic diagram illustrating a hardware configuration of an application provider server.

FIG. 6 is a schematic diagram illustrating a hardware configuration of application provider server 30. As shown in the drawing, application provider server 30 includes controller 31, communication interface 32, and hard disk 33.

Controller 31 has CPU 34, RAM 35, and ROM 36.

Communication interface 32 manages data transfer using protocols such as TCP/IP or HTTP.

Hard disk 33 stores to-do support program 33a and download page data 33b.

To-do support program 33a is a Java application program written by an operator of application provider server 30. To-do support program 33a provides a JVM of mobile terminal 10 with the following two functions.

a. To-do Text Analysis Function

This function is for identifying, among character strings constituting to-do data displayed on liquid crystal display 14, a character string identical to an index associated with a telephone number and an email address in a table stored in phonebook data storage area 18b.

b. Link Function

This function is for providing a link to execute phone call application program 17c or mailer application program 17d to a character string identified using a to-do text analysis function.

Download page data 33b is display control data described in HTML format, that represents the layout of a download page screen for prompting a user to download to-do support program 33a.

Now, a characteristic operation of the present embodiment will be described. The operation of the present embodiment is divided into a program distribution process and a to-do data review process.

Figure 7:
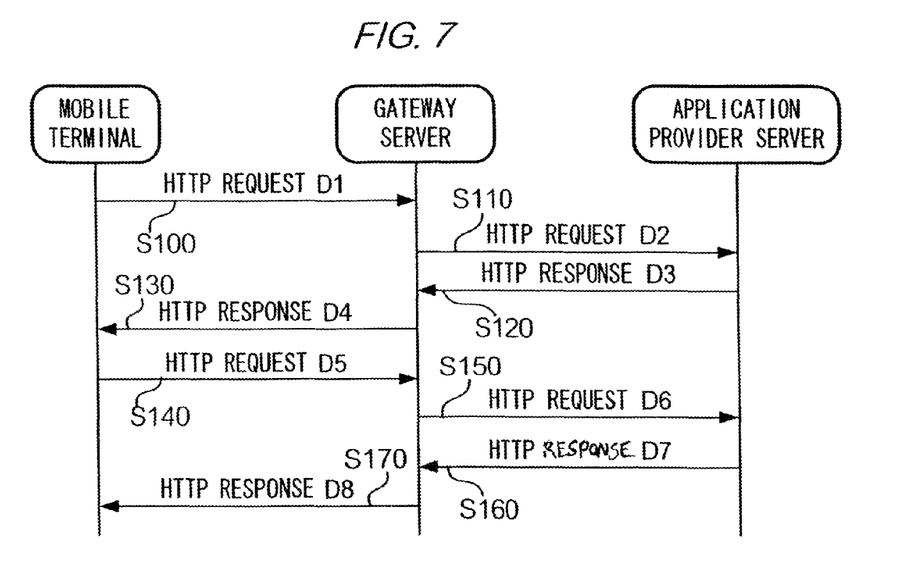
FIG. 7 is a flowchart of a program distribution process.

FIG. 7 is a flowchart illustrating a program distribution process.

When a user of mobile terminal 10 operates instruction input unit 13 to execute browser application program 17e, CPU 15 executes browser application program 17e in response to an operation signal provided from instruction input unit 13, and performs a packet registration relative to a packet subscriber processing device on mobile packet communication network 20. This packet registration is a registration procedure for mobile terminal 10 to exchange packets with mobile packet communication network 20. After a packet registration is completed, mobile terminal 10 is able to exchange packets with gateway server 50.

When a user of mobile terminal 10 operates instruction input unit 13 to input a URL of download page data 33b, CPU 15 of mobile terminal 10 sends HTTP request D1 containing the URL to mobile packet communication network 20 via transmitter/receiver 12 (S100). HTTP request D1 is received by gateway server 50, and converted to HTTP request D2 formatted for a protocol of Internet 40 by gateway server 50. HTTP request D2 is transferred to Internet 40 by gateway server 50 (S110).

Application provider server 30, on receipt of HTTP request D2, retrieves download page data 33*b* from a storage area of hard disk 33, that is identified by the URL contained in HTTP request D2, and sends HTTP response D3 containing download page data 33*b* to Internet 40 (S120). HTTP response D3 sent from application provider server 30 is received by gateway server 50, and transferred to mobile packet communication network 20 as HTTP response D4 (S130).

HTTP response D4 transferred by gateway server 50 is received by transmitter/receiver 12 of mobile terminal 10. After HTTP response D4 is received, CPU 15 of mobile terminal 10 stores HTTP response D4 in RAM 16, and causes liquid crystal display 14 to display a download page screen represented by download page data 33*b* contained in HTTP response D4. On the download page screen, a message prompting a user to download to-do support program 33*a* and a determination button to instruct downloading of to-do support program 33*a* are shown.

In this situation, if a user operates instruction input unit 13 to click the determination button, CPU 15 sends HTTP request D5 containing a URL of to-do support program 33*a* to mobile packet communication network 20 via transmitter/receiver 12 (S140).

HTTP request D5 sent from mobile terminal 10 is received by gateway server 50. HTTP request is transferred to Internet 40 by gateway server 50 as HTTP request D6 (S150), and HTTP request D6 is received by application provider server 30. Application provider server 30, on receipt of HTTP request D6, retrieves to-do support program 33*a* from a storage area of hard disk 33, that is identified by the URL contained in HTTP request D6, and sends HTTP response D7 containing to-do support program 33*a* to Internet 40 (S160). HTTP response D7 sent from application provider server 30 is converted to HTTP response D8 by gateway server 50, and HTTP response D8 is sent to mobile terminal 10 by gateway server 50 (S170). Mobile terminal 10, on receipt of HTTP response D8, stores to-do support program 33*a* contained in HTTP response D8 in Java application storage area 18*a* of EEPROM 18.

Figure 8:
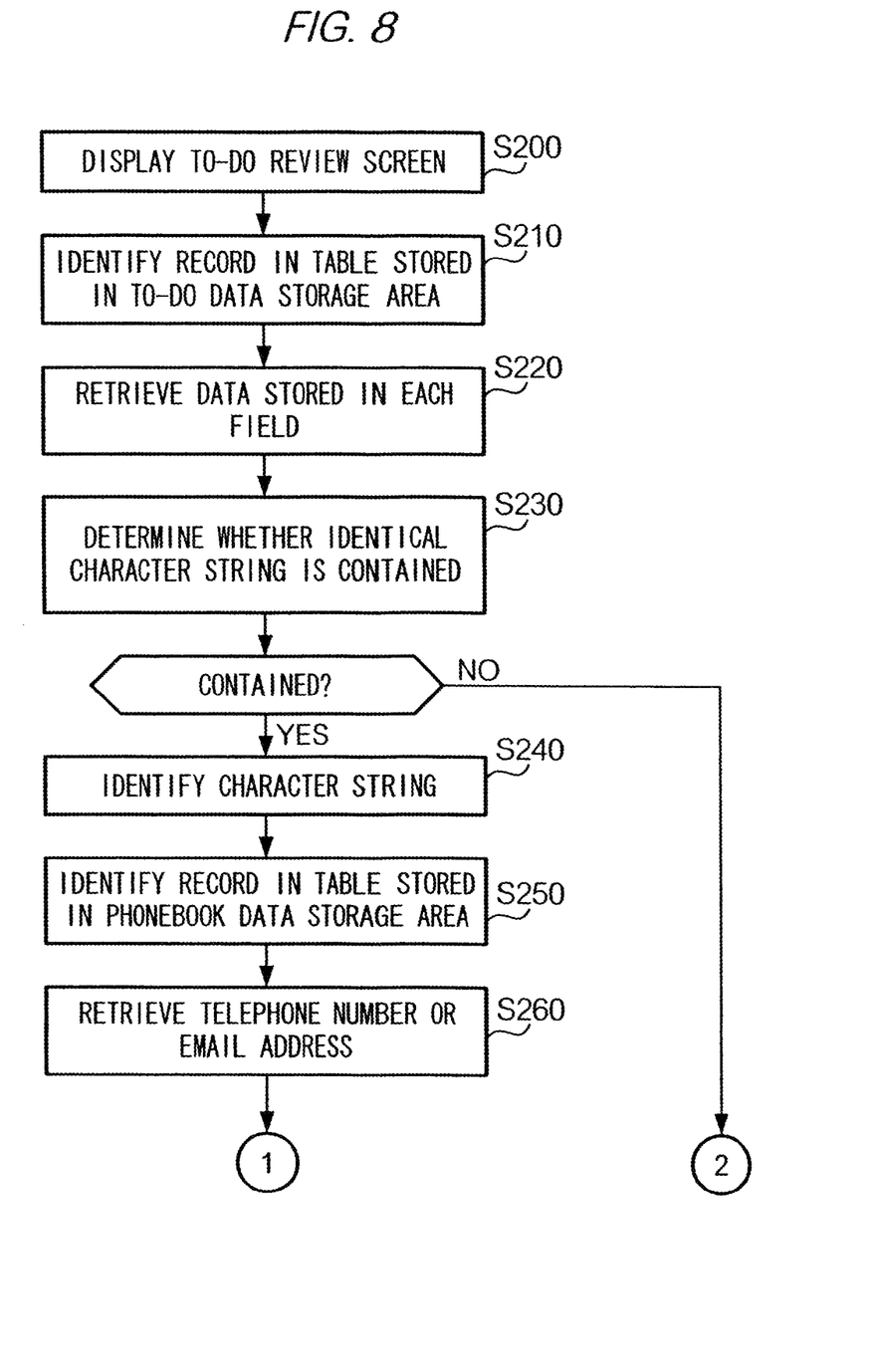
FIG. 8 is a flowchart of the first half of a to-do data review process.
Figure 9:
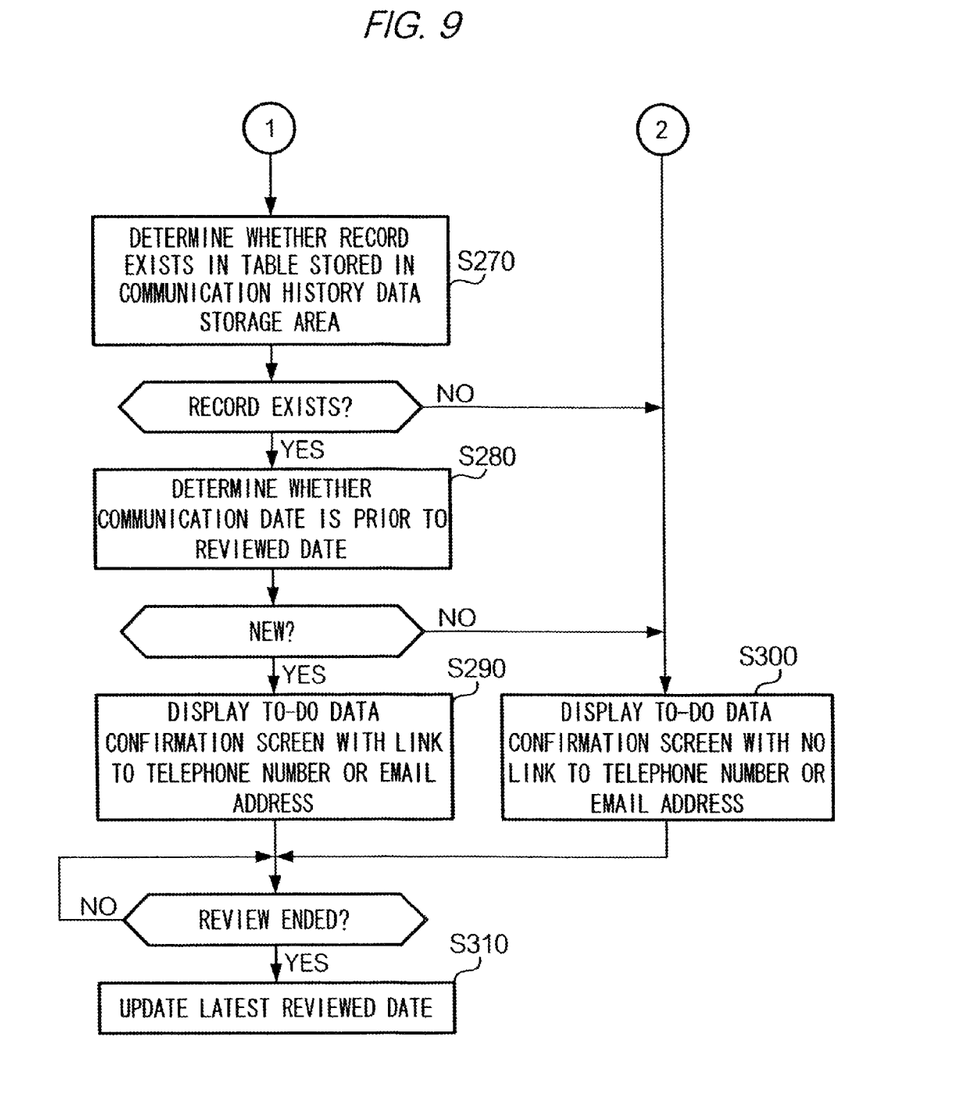
FIG. 9 is a flowchart of the second half of a to-do data review process.

FIGS. 8 and 9 are flowcharts of a to-do data review process. The process is started if a user operates, when to-do support program 33*a* is running, instruction input unit 13 of mobile terminal 10 to execute to-do management application program 17*g*.

When to-do management application program 17*g* is executed, CPU 15 of mobile terminal 10 causes liquid crystal display 14 to display a to-do review screen (S200).

Figure 10:
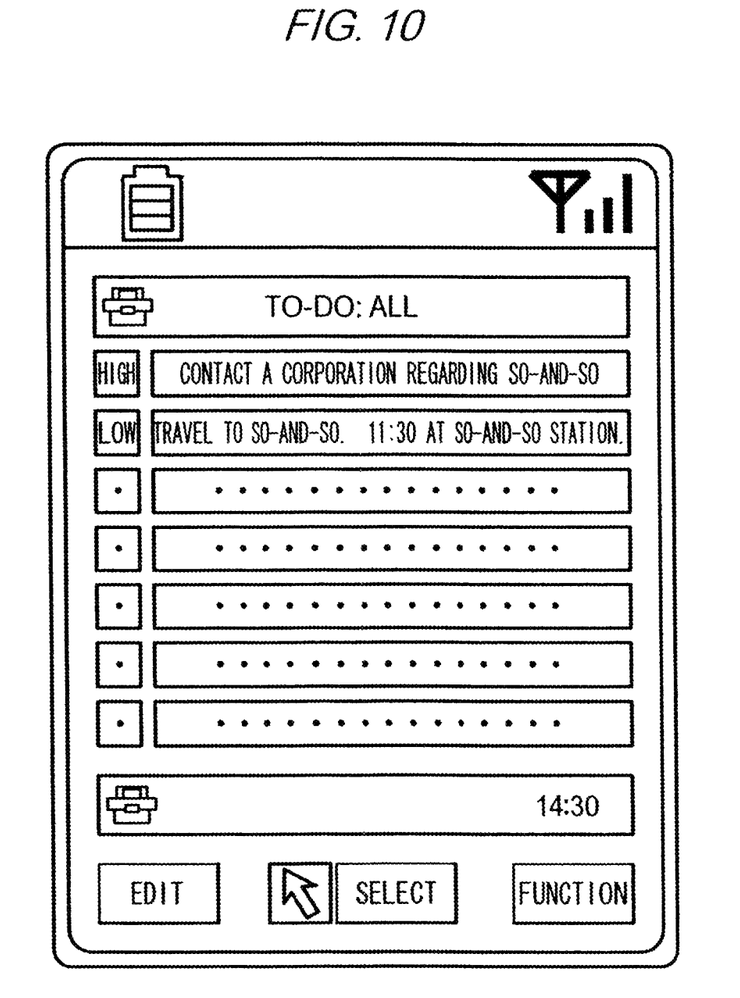
FIG. 10 is a diagram illustrating a to-do review screen.

FIG. 10 is a diagram illustrating a to-do review screen. On a to-do review screen, pairs of a priority level of a task and the first fifteen characters of content of the task are listed. A priority level of a task is data stored in a field of "priority level" of a table stored in to-do data storage area 18*c*, and content of a task is data stored in a field of "task" of a table stored in to-do data storage area 18*c*. A user operates instruction input unit 13 to highlight and select to-do data whose details are to be confirmed.

If any to-do data is selected, CPU 15 of mobile terminal 10 identifies a record of the to-do data in a table stored in to-do data storage area 18*c* (S210), and writes data stored in fields of "task", "date", "priority level", "category", "alarm notification" and "latest reviewed date" in RAM 16 (S220).

Subsequently, CPU 15 determines whether there is a character string in text extracted from a field of "task" at step S210, that is identical to a character string stored in a field of "index" of any records of a table stored in phonebook data storage area 18*b* (S230).

If the determination at step S230 is affirmative, CPU 15 identifies the character string (S240).

CPU 15 also identifies a record storing the character string identified at step S240 in a field of "index", in the table stored in phonebook data storage area 18*b* (S250), and writes a telephone number stored in a field of "telephone number" of the record identified at step S250 and an email address stored in a field of "email address" of the same record, in RAM 16 (S260).

Subsequently, CPU 15 determines whether there is a record in a table stored in communication history data storage area 18*d*, that stores the telephone number or the email address retrieved at step S260 (S270).

If the determination at step S270 is affirmative, CPU 15 determines whether a time and date stored in a field of "communication date" of the record is prior to a time and data retrieved from a field of "latest reviewed date" at step S220 (S280).

If the determination at step S270 is affirmative, and the determination at S280 is affirmative, CPU 15 lays out data retrieved from each field at step S220, and causes liquid crystal display 14 to display a to-do data confirmation screen in which the character string identified at step S240 is linked to the telephone number and/or the email address retrieved at step S260 (S290).

Figure 11:
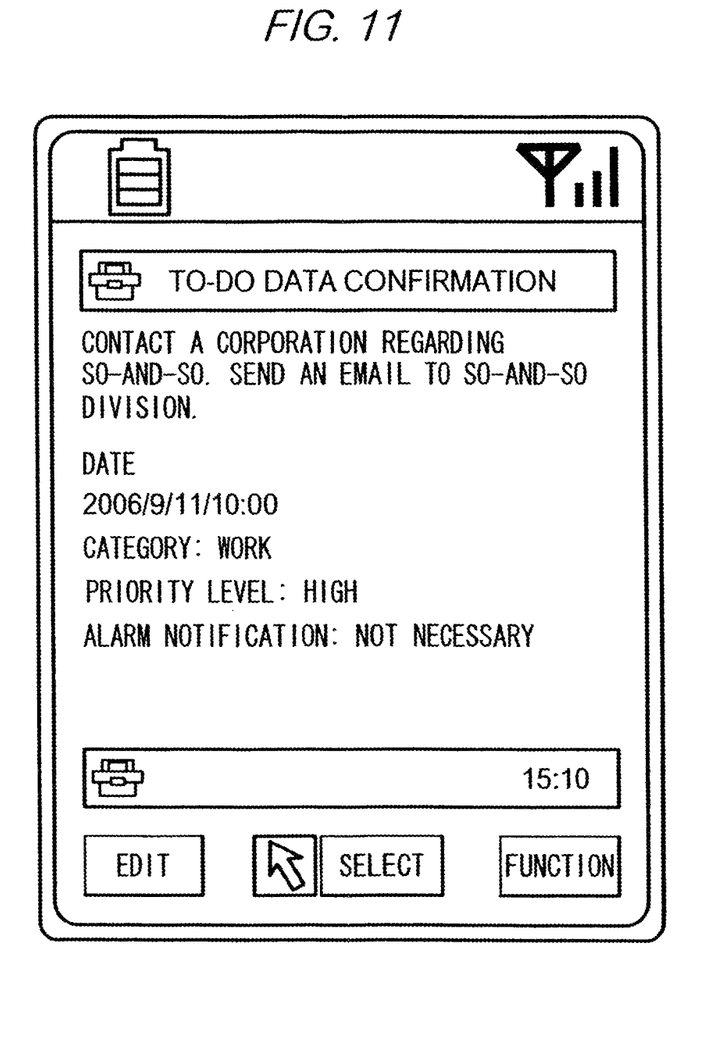
FIG. 11 is a diagram illustrating an example of a to-do data confirmation screen.

FIG. 11 is a diagram illustrating an example of a to-do data confirmation screen displayed at step S290. In the screen shown in the drawing, text "contact A corporation regarding so-and-so. send an email to so-and-so a division.", which is content of a task retrieved from a field of "task", is first shown, and data retrieved from fields of "date", "category", "priority level", and "alarm notification" are shown behind the text. In the screen shown in the drawing, the text contains a character string "A corporation", which is a character string stored as an index (reference name) in a table stored in phonebook data storage area 18*b*, and the character string is underlined to indicate that the character string is linked to a telephone number or an email address. This means that from a previous time when the to-do data was reviewed to a present time when the to-do data is being reviewed, a call to A corporation has not been originated or an email to A corporation has not been sent. If the underlined character string is selected by use of instruction input unit 13, phone call application program 17*c* or mailer application program 17*d* is immediately executed, and a screen of liquid crystal display 14 is switched to a screen prompting a user to originate a call or send an email.

On the other hand, if the determination at step S230 is negative, the determination at step S270 is negative, or the determination at step S280 is negative, CPU 15 causes liquid crystal display 14 to display a to-do data confirmation screen in which no character string is linked to a telephone number or an email address (S300).

Figure 12:
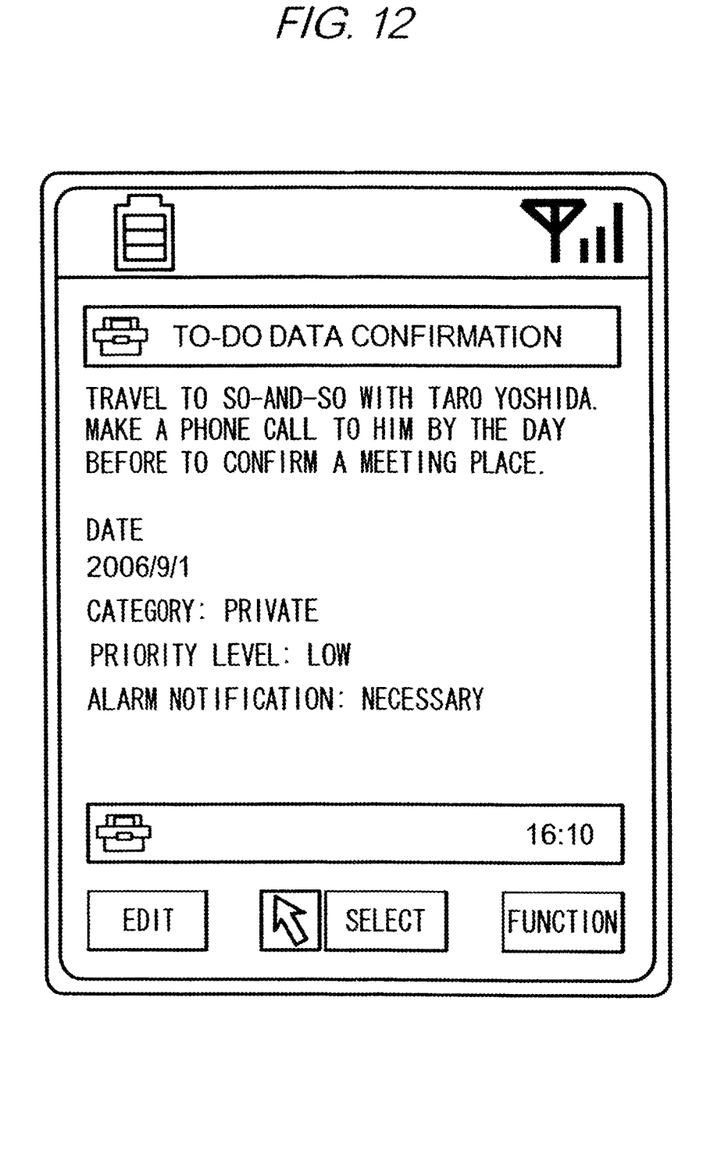
FIG. 12 is a diagram illustrating an example of a to-do data confirmation screen.

FIG. 12 is a diagram illustrating an example of a to-do data confirmation screen displayed at step S300. In the screen shown in the drawing, text "travel to so-and-so with Taro Yoshida. make a phone call to him by the previous day to confirm a meeting place.", which is content of a task retrieved from a field of "task", is first shown, and data retrieved from fields of "date", "category", "priority level", and "alarm notification" are shown behind the text. In the screen shown in the drawing, although the text contains a character string "Taro Yoshida", which is a character string stored as an index (reference name) in a table stored in phonebook data storage area 18*b*, the character string is not underlined to indicate that the character string is linked to a telephone number or an email address. This means that from a previous time when the to-do data was reviewed to a present time when the to-do data is being reviewed, a call to Taro Yoshida has been originated or an email to Taro Yoshida has been sent.

After a to-do data confirmation screen is displayed, if a user operates instruction input unit 13 to end a review of to-do data, CPU 15 updates a time and date stored in a field of "latest reviewed date" of the record identified at step S210 to a present time and date (S310), and causes liquid crystal display 14 to display a standby screen.

As described above, in mobile terminal 10 according to the present embodiment, when to-do date is selected on a to-do review screen, details of the to-do data is displayed as text on a to-do data confirmation screen, and if the text contains a character string that is stored as an index of a telephone number or an email in a table stored in phonebook data storage area 18b, the character string is linked to a telephone number or an email address. Accordingly, a user is able to complete a task without manually executing phone call application program 17c or mailer application program 17d and manually inputting a telephone number or an email address displayed on a to-do data confirmation screen, or without searching a table stored in phonebook data storage area 18b for a telephone number or an email address.

The above embodiment may be modified in various ways.

1) In the above embodiment, a mobile terminal may be any communication terminal capable of communicating.

2) In the above embodiment, where when a to-do data confirmation screen is displayed, if a communication has been made from a previous time when to-do data was reviewed to a present time when the to-do data is being reviewed, a character string representing the contacted entity, even if the character string is stored as an index in a table stored in phonebook data storage area 18b, is not linked to a telephone number or an email address, the character string may be linked to a telephone number or an email address. In this case, a fact that a communication has been made may be expressed by a change in a display style of the character string relative to a case where a communication has not been made. For example, a character string representing an entity to which a communication has not been made may be shown in red to attract attention, and a character string representing an entity to which a communication has been made may be shown in black. According to the present modification, if a communication has been made from a previous time when to-do data was reviewed to a present time when the to-do data is being reviewed, a user is able to immediately contact an entity that has been contacted before.

3) In the above embodiment, after a communication is made to an entity represented by a character string linked to a communication address, the link may be broken. Alternatively, the link may be broken after a message is displayed on liquid crystal display 14 to ask a user whether the link may be broken, and an instruction from a user to break the link is received.

4) In the above embodiment, where a communication address is stored in communication history data storage area 18d when a communication is made to the communication address, a telephone number, among communication addresses, may be stored in communication history data storage area 18d after it is confirmed that a telephone conversation actually takes place with an intended entity, by use of voice-recognition technology. To realize the present modification, it is necessary to obtain in advance voice data of a person to be contacted, for example, by recording voice during a voice call, and storing the voice data in a predetermined storage area of EEPROM 18 in association with a telephone number of a communication terminal of the person. CPU 15 matches voice data received by transmitter/receiver 12 from a communicating terminal to voice data stored in EEPROM 18 in association with a telephone number of the terminal to determine a similarity level between the two pieces of voice data, and if the similarity level is above a predetermined threshold, stores the telephone number in a table stored in communication history data storage area 18d. According to the present modification, a telephone number is stored in communication history data storage area 18d after it is confirmed that a telephone conversation actually takes place with an intended entity.

5) In the above embodiment, where phonebook data stored in phonebook data storage area 18b is generated using phonebook management application program 17f, the phonebook data may be downloaded through mobile packet communication network 20 or Internet 40. In this case, phonebook data of companies may be obtained by carrying out a robot-type search on Internet 40 using the name of a company as a search key. A communication address stored in phonebook data storage area 18b may be not only a telephone number and an email address, but also other communication addresses assigned to a communication terminal to enable communication with the communication terminal.

6) In the above embodiment, where to-do support program 33a that provides mobile terminal 10 with functions characteristic of the embodiment is stored in hard disk 33 of application provider server 30 on Internet 40 as a Java application program, and is downloaded to mobile terminal 10 in response to a request, a program that provides mobile terminal 10 with functions equivalent to those of to-do support program 33a may be pre-installed in ROM 17 of mobile terminal 10. Alternatively, such a program may be provided to mobile terminal 10 through a recording medium such as a magnetic recording medium (e.g. a magnetic tape, a magnetic disk, or a floppy disk), an optical recording medium (e.g. an optical disk or a DVD), a magneto-optical medium, or a semiconductor memory (e.g. a flash memory).

7) In the above embodiment, where a character string to be linked to a telephone number or an email address using to-do support program 33a is a character string contained in to-do data generated using to-do management application program 17g, a character string contained in data edited using other application programs may be linked to a telephone number or an email address. For example, since most recent cell-phones are provided with a PIM (Personal Information Manager) application program, which serves as phonebook management application program 17f, to-do management application program 17g, and a note management application program for managing notes taken by a user, a character string contained in note data edited using a PIM application program may be linked to a telephone number or an email address.

What is claimed is:
1. A communication terminal comprising:
a display;
a communication interface;
a first memory having:
a first storage area in which to-do data including a character string can be stored, wherein the to-do data is data on a task to be completed by a user;
a second storage area in which a communication address assigned to another communication terminal can be stored in association with a reference name, wherein the reference name is a name of an individual or a company; and a third storage area in which a communication address to which communication has been made using the communication interface can be stored, wherein the first, second, and third storage areas are separate and distinct from one another;

a second memory that stores a phone call application program, a mailer application program, and a to-do management application program for managing to-do data stored in the first storage area;

an instruction input unit; and a processor configured to:

identify a character string that is contained in to-do data stored in the first storage area and is identical to a reference name stored in the second storage area, the reference name not being a reference name stored in association with a communication address to which communication has been made using the communication interface for a given period of time;

display the identified character string with a link to a communication address stored in the second storage area in association with the reference name identical to the identified character string, on the display; and in response to selection of the identified character string displayed on the display, using the instruction input unit, execute one of the phone call application program and the mailer application program stored in the second memory, wherein the selection of the identified character triggers the execution of one of the phone call application program and the mailer application program.

2. The communication terminal according to claim 1, further comprising a third memory in which voice data can be stored in association with a communication address, wherein:

the processor is further configured to:

match voice data received from another communication terminal using the communication interface to voice data stored in the third memory to determine a similarity level between the two pieces of voice data; and in response to a determination that the determined similarity level is above a predetermined threshold, store a communication address stored in the third memory in association with the voice data stored in the third memory.

3. The communication terminal according to claim 1, wherein the communication address includes a telephone number and an email address.

4. The communication terminal according to claim 1, wherein:

in the third storage area, a communication address to which communication has been made using the communication interface can be stored in association with a communication time and date when the communication has been made;

the processor is configured to store a communication address in the third storage area in association with a communication time and date when communication to the communication address has been made using the communication interface; and the processor is configured to identify a character string that is contained in data stored in the first storage area and is identical to a reference name stored in the second storage area, the reference name being not a reference name stored in association with a communication address to which communication has been made using the communication interface for a given period of time, the communication address being stored in association with a communication time and date belonging to a predetermined time period.

5. The communication terminal according to claim 1, wherein the to-do data comprises data on a content of the task, a date on which the task is completed, a priority level, a category of the task, and necessity of an alarm notification that is activated when the date arrives.

6. A communication terminal comprising:

a display;

a communication interface;

a first memory having:

a first storage area in which to-do data including a character string can be stored, wherein the to-do data is data on a task to be completed by a user;

a second storage area in which a communication address assigned to another communication terminal can be stored in association with a reference name, wherein the reference name is a name of an individual or a company; and a third storage area in which a communication address to which communication has been made using the communication interface can be stored, wherein the first, second and third storage areas are separate and distinct from one another;

a second memory that stores a phone call application program, a mailer application program, and a to-do management application program for managing to-do data stored in the first storage area;

an instruction input unit; and a processor configured to:

identify a character string that is contained in to-do data stored in the first storage area and is identical to a reference name stored in the second storage area;

display the identified character string in a first display style, if the reference name identical to the identified character string is a reference name stored in association with a communication address to which communication has been made using the communication interface for a given period of time;

display the identified character string in a second display style, if the reference name identical to the identified character string is not a reference name stored in association with a communication address to which communication has been made using the communication interface for a given period of time; and in response to selection of the identified character string displayed, using the instruction input unit, execute one of the phone call application program and the mailer application program stored in the second memory, wherein the selection of the identified character triggers the execution of one of the phone call application and the mailer application program.

7. The communication terminal according to claim 6, further comprising a third memory in which voice data can be stored in association with a communication address, wherein:

the processor is further configured to:

match voice data received from another communication terminal using the communication interface to voice data stored in the third memory to determine a similarity level between the two pieces of voice data; and in response to a determination that the determined similarity level is above a predetermined threshold, store a communication address stored in the third memory in association with the voice data stored in the third memory.

8. The communication terminal according to claim 6, wherein the communication address includes a telephone number and an email address.

9. The communication terminal according to claim 6, wherein the to-do data comprises data on a content of the task, a date on which the task is completed, a priority level, a category of the task, and necessity of an alarm notification that is activated when the date arrives.

10. A non-transitory computer readable medium storing a program for causing a processor of a computer having:
a display;
a communication interface;
a first memory having:
a first storage area in which to-do data including a character string can be stored, wherein the to-do data is data on a task to be completed by a user; and
a second storage area in which a communication address assigned to another communication terminal can be stored in association with a reference name, wherein the reference name is a name of an individual or a company;
a third storage area in which a communication address to which communication has been made using the communication interface can be stored, wherein the first, second, and third storage areas are separate and distinct from one another;
a second memory that stores a phone call application program, a mailer application program, and a to-do management application program for managing to-do data stored in the first storage area; and
an instruction input unit, to:
identify a character string that is contained in to-do data stored in the first storage area and is identical to a reference name stored in the second storage area, the reference name being not a reference name stored in association with a communication address to which communication has been made using the communication interface for a given period of time;
display the identified character string with a link to a communication address stored in the second storage area in association with the reference name identical to the identified character string, on the display; and
in response to selection of the identified character string displayed on the display, using the instruction input unit, execute one of the phone call application program and the mailer application program stored in the second memory, wherein the selection of the identified character triggers the execution of one of the phone call application program and the mailer application program.

11. The non-transitory computer readable medium according to claim 10, wherein the to-do data comprises data on a content of the task, a date on which the task is completed, a priority level, a category of the task, and necessity of an alarm notification that is activated when the date arrives.

12. A non-transitory computer readable medium storing a program for causing a processor of a computer having:
a display;
a communication interface;
a first memory having:
a first storage area in which to-do data including a character string can be stored, wherein the to-do data is data on a task to be completed by a user;
a second storage area in which a communication address assigned to another communication terminal can be stored in association with a reference name, wherein the reference name is a name of an individual or a company; and
a third storage area in which a communication address to which communication has been made using the communication interface can be stored, wherein the first, second, and third storage areas are separate and distinct from one another;
a second memory that stores a phone call application program, a mailer application program, and a to-do management application program for managing to-do data stored in the first storage area; and
an instruction input unit, to:
identify a character string that is contained in to-do data stored in the first storage area and is identical to a reference name stored in the second storage area;
display the identified character string in a first display style, if the reference name identical to the identified character string is a reference name stored in association with a communication address to which communication has been made using the communication interface for a given period of time;
display the identified character string in a second display style, if the reference name identical to the identified character string is not a reference name stored in association with a communication address to which communication has been made using the communication interface for a given period of time; and
in response to selection of the identified character string displayed, using the instruction input unit, execute one of the phone call application program and the mailer application program stored in the second memory, wherein the selection of the identified character triggers the execution of one of the phone call application program and the mailer application program.

13. The non-transitory computer readable medium according to claim 12, wherein the to-do data comprises data on a content of the task, a date on which the task is completed, a priority level, a category of the task, and necessity of an alarm notification that is activated when the data arrives.

* * * * *